No. 892,265. PATENTED JUNE 30, 1908.
D. P. & H. C. JUDSON.
CAR WHEEL AND AXLE.
APPLICATION FILED AUG. 12, 1907.
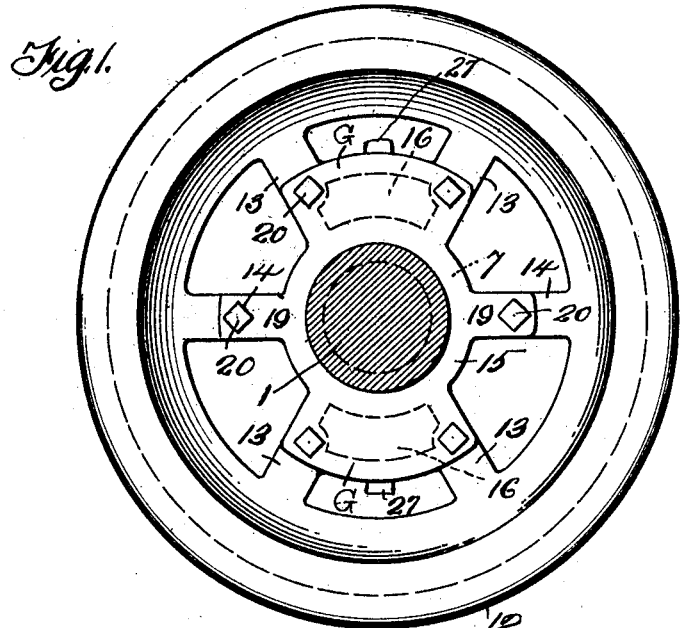
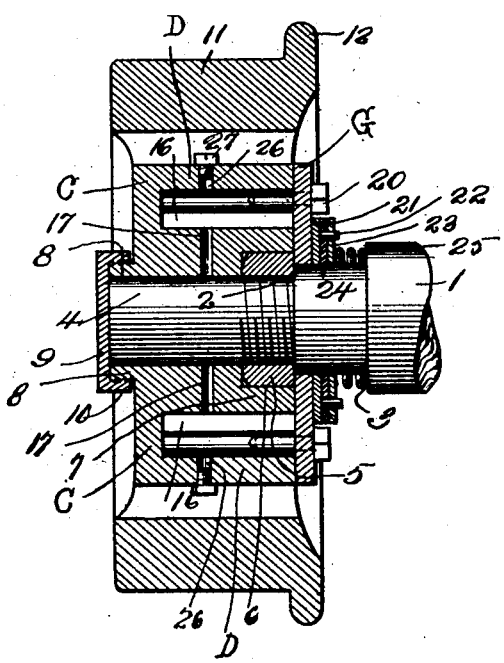
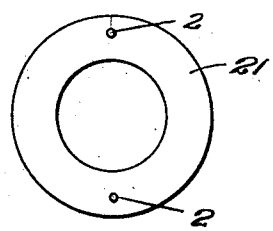
Witnesses
Samuel Payne
R. H. Butler
Inventors,
H. C. Judson.
D. P. Judson.
By
Attorneys

UNITED STATES PATENT OFFICE.

DAVID P. JUDSON, OF VERONA, AND HARLAND C. JUDSON, OF MONTEREY, PENNSYLVANIA.

CAR WHEEL AND AXLE.

No. 892,265.        Specification of Letters Patent.        Patented June 30, 1908.

Application filed August 12, 1907. Serial No. 388,244.

*To all whom it may concern:*

Be it known that we, DAVID P. JUDSON, residing at Verona, in the county of Allegheny, and HARLAND C. JUDSON, residing at Monterey, in the county of Clarion, State of Pennsylvania, citizens of the United States of America, have invented certain new and useful Improvements in Car Wheels and Axles, of which the following is a specification, reference being had therein to the accompanying drawing.

This invention relates to car wheels and axles, especially designed for use upon minecars, and its primary object is, to provide a wheel so constructed as to insure the continuous automatic lubrication of the axle.

A further object of the invention is, to provide a car wheel and axle with effective means for excluding dust and water from the axle journal.

The construction of the improvement will be fully described hereinafter, in connection with the accompanying drawing which forms a part of the specification, and its features of novelty will be set forth and defined in the appended claims.

In the drawing, Figure 1 is an elevation of the inner side of a car wheel embodying the invention, the axle of the wheel being shown in section, Fig. 2 is a central sectional view of the wheel with the axle in elevation, and Fig. 3 is a side elevation of a washer-plate mounted on the axle, and bearing against the inner side of the wheel.

The reference numeral 1 designates an axle circumferentially reduced to provide annular shoulders 2 and 3 and a journal 4. The journal 4 is screw-threaded adjacent to the shoulder 2, to receive a nut 5, said nut fitting within a circular pocket 6 formed on the inner face of the wheel hub 7, and bearing against the shoulder 2 of the axle. Upon the outer face of the wheel hub is formed an annular projection 8 externally screw-threaded to receive a dust-cap 9 having an internally-threaded annular flange 10.

The numeral 11 designates the tread of the wheel provided with the usual flange 12, and connected by spokes 13 and 14 to the hub 7.
Formed integral with two pairs of spokes is a plate C which terminates in a bridge D. The plate C in connection with the bridge D and the spokes form two lubricant chambers 16, which are closed through the medium of ring 15 with a pair of segment shaped extensions G and a pair of laterally extending arms 19. The segment shaped extensions G as well as the arms 19 being secured to the spokes as clearly shown in Fig. 1. The hub 7 is formed with a port 17 for supplying the lubricant to the chamber 16 and to the journal 4. The plate C is secured to the spokes by the bolts 20.

To insure an oil, dust, and water-proof connection between the closure plate 15, and the wheel and axle, we employ a spring-pressed washer mounted upon the axle and bearing against said closure plate. This washer comprises a metal ring 21 provided with projecting pins 22, a second metallic ring 23 having openings to receive said pins, and a packing 24 of leather or other yielding material interposed between the two metal rings 21 and 23.

A coil spring 25 encircles the axle 1 between its shoulder 3 and the ring 23, one end of said spring being secured to the axle, and the other to the composite washer, and serving to force said washer against the closure plate 15. As the diameter of the opening in the closure plate is smaller than the diameter of the nut 5, the said plate overlaps the nut as shown in Fig. 2, providing a dust-proof connection as well as coöperating with the nut 5 and constituting means for retaining the wheel upon the journal.

The oil chambers 16 are supplied with oil through openings 26 closed by screw plugs 27, and it will be apparent that an effective automatic lubrication of the axle journal will be maintained as long as there is lubricant in the oil chambers.

Having now described our invention what we claim as new, is:—

A self lubricating wheel comprising a hub portion, a rim portion, spokes formed integral with the hub and rim, a plate formed integral with two pairs of spokes and terminating at each end in a bridge positioned between the said pairs of spokes with which said plate is formed integral, said plate at each end terminating at a point removed from the rim, a ring secured to said hub and provided with a pair of segment shaped extensions connected to certain of the spokes and further provided with a pair of projections connected to the other of the spokes, said extensions of said ring constituting the inner wall of said chambers, means whereby a lubricant can be supplied to said chambers, and said hub provided with means for discharging the lubricant from the chamber, and a spring pressed element mounted against the inner portion of said ring.

In testimony whereof we affix our signatures in the presence of two witnesses.

DAVID P. JUDSON.
HARLAND C. JUDSON.

Witnesses as to David P. Judson:
    THOS. J. MILLER,
    E. C. LEWIS.

Witnesses as to Harland C. Judson:
    P. A. STEWART,
    S. W. BARGER.